US009563991B2

(12) United States Patent
Menzel

(10) Patent No.: US 9,563,991 B2
(45) Date of Patent: Feb. 7, 2017

(54) DYNAMICALLY AUTHORIZING ACCESS TO RESTRICTED AREAS

(71) Applicant: Apple Inc., Cupertino, CA (US)

(72) Inventor: Martin M. Menzel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 13/785,481

(22) Filed: Mar. 5, 2013

(65) Prior Publication Data

US 2014/0253285 A1 Sep. 11, 2014

(51) Int. Cl.
*G05B 19/00* (2006.01)
*G07C 9/00* (2006.01)

(52) U.S. Cl.
CPC ....... *G07C 9/00023* (2013.01); *G07C 9/00126* (2013.01); *G07C 2209/08* (2013.01)

(58) Field of Classification Search
CPC ............. G07C 9/00103; G07C 9/0023; G07C 2209/08
USPC .................................................... 340/5.7, 5.6
See application file for complete search history.

(56) References Cited

U.S. PATENT DOCUMENTS

2003/0081746 A1* 5/2003 Ahlstrom et al. ....... 379/102.06
2007/0273474 A1* 11/2007 Levine ......................... 340/5.28
2011/0221565 A1* 9/2011 Ludlow et al. ................ 340/5.6

* cited by examiner

*Primary Examiner* — Vernal Brown
(74) *Attorney, Agent, or Firm* — Blank Rome LLP

(57) ABSTRACT

A dynamic access server engine on a server may be configured to receive a request for access to a restricted area during a specific time period. If there is no scheduling conflict the engine can schedule the access period. Additionally, the request may be associated with one or more invitees. For each invitee, the engine determines whether the invitee is authorized to temporarily access the restricted area. If authorized, the engine automatically grants to the invitee temporary access to the restricted area during the scheduled period.

18 Claims, 6 Drawing Sheets

DYNAMICALLY AUTHORIZING ACCESS TO RESTRICTED AREAS

BACKGROUND

There are numerous systems for managing access to restricted areas. Corporate and government employees use key codes or access badges to enter buildings or secure areas where sensitive information is stored or private meetings are held. Bank cashier's use codes, badges, or keys to access a cashier's cage. And hotel patrons use card keys to enter their hotel rooms. All of these systems have at least one thing in common—access to the restricted area is managed by manual intervention. For example, if an individual wants to access the area an administrator will activate or deactivate an access card or key code for the individual. Alternatively, someone authorized to access the secure area can manually open the door for the individual.

While the aforementioned systems provide security, manual administrative intervention has its disadvantages. For example, business meetings scheduled in restricted areas often include numerous individuals that are not authorized to access the area. Currently, an administrator has to manually issue to each unauthorized individual a temporary badge or key code for the restricted area. Alternatively, a person authorized to access the area may have to open that area's door for each unauthorized individual. The need to manually issue badges or open the door for each unauthorized individual is cumbersome and inefficient, and may elevate security risks. Therefore, there is need in the art for systems and methods that can automatically grant to an individual temporary access to a restricted area during a certain time period.

SUMMARY

A summary of certain embodiments disclosed herein is set forth below. It's understood that this section is presented merely to provide the reader with a brief summary of certain embodiments and that these descriptions are not intended to limit this application's scope. Indeed, this disclosure may encompass a variety of embodiments that may not be set forth herein.

The present application relates generally to granting temporary access to a restricted area based on a schedule. More particularly, a scheduling application may schedule access to a restricted area during a specific time period. The scheduled access may be associated with one or more invitees. Based on a dynamic evaluation, the scheduling application can determine whether an invitee is authorized to receive temporary access to the restricted area. If authorized, the system may automatically grant to the invitee temporary access to the restricted area during the scheduled period.

In one embodiment, a system can receive a request from an initiator for access to a restricted area during a specified time period. If the initiator is authorized to access the restricted area, then the system may schedule the access for the requested period. In one embodiment, the request may be associated with one or more invitees. The system can determine whether each invitee is authorized to temporarily access the restricted area. If an invitee is authorized for temporary access, the system may automatically grant to the invitee temporary access to the restricted area during the scheduled period.

In another embodiment, a system dynamically calculates a probability that an invitee is barred from temporarily accessing a restricted area. If the calculated probability is less than a preset default or administrator-defined threshold, the system may grant to the invitee temporary access to the restricted area during a specified time period. By way of example only, a probability calculation can be based on security data, including but not limited to one or more of the restricted area's security level, any security events occurring prior to the access period, any security restrictions associated with an initiator of the access, and any security restrictions associated with the invitee.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown the figures.

DETAILED DESCRIPTION

Figure 1A:
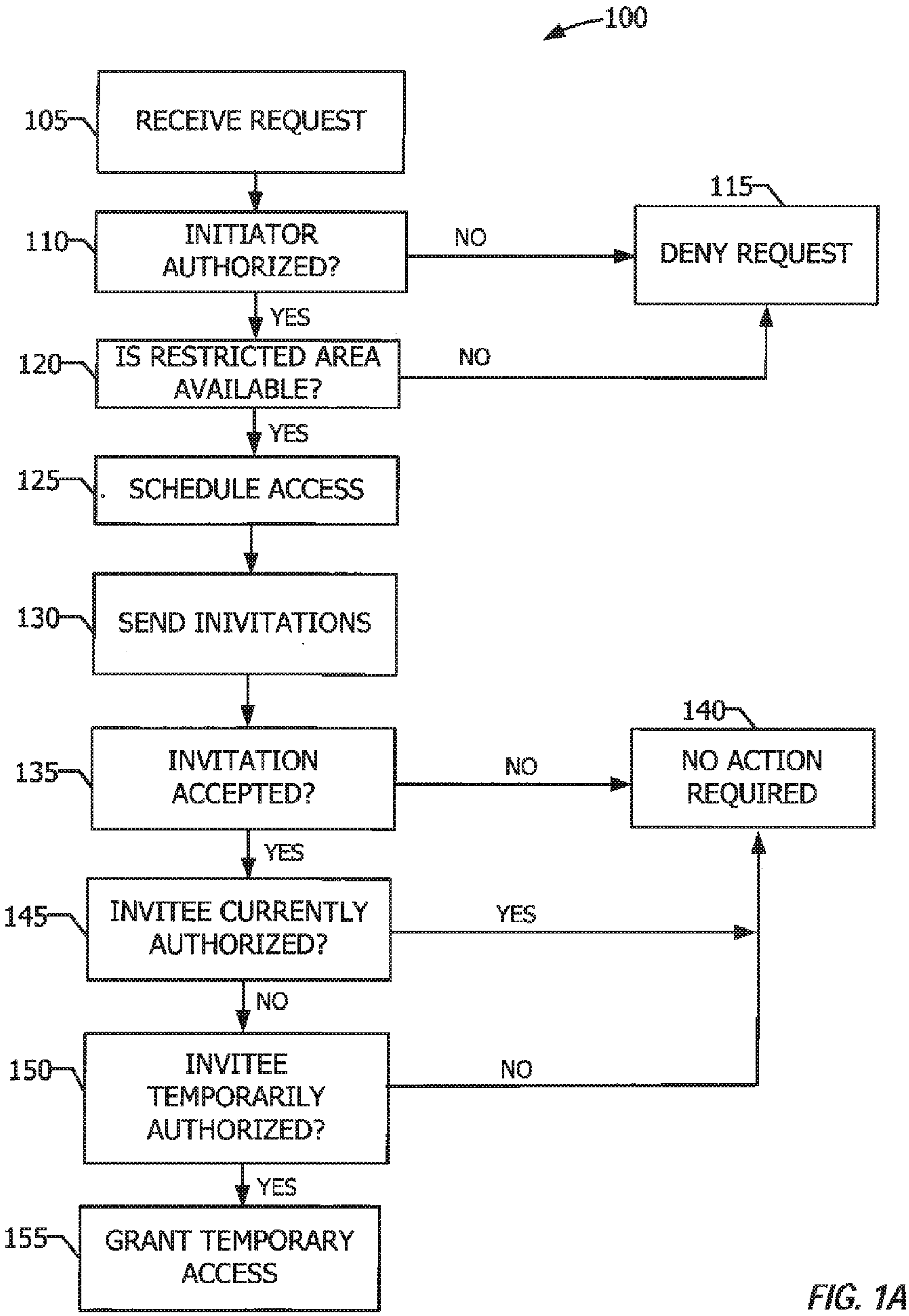
FIGS. 1A-1B are flow charts showing a method for automatically granting an invitee temporary access to a restricted area based on a scheduled meeting, in accordance with an embodiment.

This disclosure is generally directed to systems, methods, and computer readable media for dynamically granting temporary access to a restricted area. In general, the application discloses a system that can schedule access to restricted areas during certain periods of time. The scheduled access may be associated with one or more invitees that are not currently authorized to access the restricted area. Based on a dynamic evaluation, the system can determine whether an invitee is authorized to temporarily access the restricted area. If an invitee is authorized for temporary access, the system can grant to the invitee temporary access to the restricted area during the scheduled period. There are a number of ways to determine whether an invitee is authorized for temporary access. For example, in one embodiment, the system may dynamically calculate the probability that an invitee is barred from receiving temporary access to the area. If that probability is less than an administrator-defined threshold, then the invitee may be considered authorized.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented systems, methods, features, and advantages will be or become apparent to one with skill in the art upon examining the drawings and the detailed description herein. It's intended that all such additional systems, methods, features, and advantages be protected by the accompanying claims.

Referring to FIG. 1A, a scheduling application executing on server 500 (also referred to as a server application or "server") may carry out a method for granting temporary access to a restricted area 100. In one embodiment, a dynamic access server engine can carry out the method 100. The engine may function as a stand-alone application or may be integrated with the server's 500 operating system. Furthermore, the server can be any type, including but not limited to workstation and desk-top computer systems, mobile phones, music players, tablet computer systems, or other similar electronic devices.

The server may receive a request 105. In one embodiment, the request may be a request to access a restricted area. The request can be transmitted to the server from any device, including but not limited to workstation and desk-top computer systems, mobile phones, music players, tablet computer systems, or other similar electronic devices. Furthermore, in one embodiment, the request may take the form of a calendar request, appointment request, or meeting request sent from any communication channel (e.g., email). In an embodiment, a restricted area is a room or space in a building or complex with restricted access. In another embodiment, an initiator may request access to the area. The initiator may be human or may be a scheduling application that automatically generates the request (e.g., for a standing meeting). In yet another embodiment, the request may request access to the restricted area during a specific time period. In still another embodiment, the initiator may associate the request with one or more invitees. For example, the initiator may desire to hold a private meeting in the restricted area with the one or more invitees.

Following the initiator's request, the server can determine whether or not the initiator is currently authorized to make the request 110. In one embodiment, the initiator is authorized to make the request if the initiator is authorized to access the restricted area at any time. In another embodiment, the initiator is authorized to make the request if the initiator is authorized to access the restricted area during the specified period. If the initiator is not authorized, the server may deny the request 115. In one embodiment, the server may notify the initiator that the request has been denied (e.g., via email or text message). Alternatively, if the initiator is currently authorized to access the area, the server can then determine if the restricted area is available during the requested time period 120. In one embodiment, the server may determine the area's availability based on a calendar system (e.g., iCal®, iOS® Calendar, etc.).

If the restricted area is unavailable, the initiator's request is denied. In yet another embodiment, the server can notify the initiator that the request has been denied or that the area is unavailable. Otherwise, if the restricted area is available, the server may schedule the access request 125. In one embodiment, the restricted area is available when no other requests have been previously scheduled for the area during the specified time period. In another embodiment, the server may schedule the access request via a calendar system. In another embodiment, the server may notify the initiator that the requested access has been scheduled.

Next, the server may send an invitation to the one or more associated invitees, if any 135. In one embodiment, an invitation requests an invitee's attendance at the restricted area during a specified time period. The invitee may choose to accept or decline the invitation. If an invitee declines the invitation 135, no action is required 140. Otherwise, if the invitee accepts the invitation 135, the server may then determine whether the invitee is currently authorized to access the restricted area 145. In one embodiment, the invitee is currently authorized to access the restricted area if the invitee has been previously granted authority to access the restricted area and the authority is still valid. If currently authorized, then no further action is required since the invitee will have access to the restricted area during the scheduled period. If not currently authorized, then the server may determine whether the invitee is authorized to temporarily access the restricted area 150. In one embodiment, this determination can be based on a dynamic evaluation of one or more security data, which is described in extensive detail below.

If the invitee is barred from temporary access, then no further action is required 140 and the invitee will not be able to access the restricted area without other manual intervention. In one embodiment, the server may notify the initiator and/or invitee that the invitee is barred from temporary access (e.g. via email or text message).

If the invitee is authorized for temporary access, then the server may grant to the invitee temporary access to the restricted area 155. In one embodiment, temporary access allows the invitee to access the restricted area only during the scheduled time period. After the scheduled time period ends, temporary access is deactivated. In another embodiment, temporary access allows the invitee to access the restricted area during the scheduled period and within a certain time frame prior to or after the scheduled period. In yet another embodiment, the server may grant temporary access by transmitting a temporary key code to the invitee. For example, the invitee can access the restricted area by entering this key code at the area door's key code panel during the scheduled period. At the end of the scheduled period, the server or door may automatically disable the key code. In another embodiment, the server may download the invitee's badge ID (e.g., employee badge ID) to the area door's badge reader. In still another embodiment, the door's badge reader may temporarily store the invitee's badge ID in an access control list. When the invitee swipes their badge at the badge reader it can verify the invitee's badge against the access control list. When the scheduled period ends, the server or badge reader removes the invitee's badge ID from the access control list. In yet another embodiment, the server may temporarily add the invitee's badge ID to an access control list stored in the server. When the invitee swipes their badge at the badge reader it communicates with the server to verify the invitee's badge against the access control list. At the end of the scheduled period, the server can remove the invitee's badge ID from the access control list.

In an embodiment, the scope of temporary access may be based on preset default or administrator-defined parameters. For example, in one embodiment, temporary access may include unlimited access to the restricted area during the scheduled period. In yet another embodiment, temporary access may include limited access to the restricted area during the scheduled period. For example, the server may limit the number of times the invitee can access the area during the scheduled period. Alternatively, the server may limit the time period during which the invitee can access the area during the scheduled period (e.g., within 5 minutes of the start of the scheduled period). In still another embodiment, the server may grant temporary access for the scheduled period plus an additional amount of time prior to the scheduled period (e.g., 10 minutes prior to start of period).

In an embodiment, the server can monitor the initiator's area access rights between the time the access is scheduled and the time the scheduled period begins. In one embodiment, monitoring the initiator's access right includes determining whether the initiator has lost the right to access the area at all times or during the scheduled period. For example, if the initiator loses the right to access the area any time prior to the scheduled period, the server may de-schedule the access, notifying the initiator and/or invitees. In another embodiment, if the server de-schedules the access all temporary access rights may be rescinded. In yet another embodiment, the server may monitor the initiator's access rights in real time. Alternatively, the server may determine the initiator's access rights within a certain time period prior to the start of the scheduled period.

In an additional embodiment, the server can monitor an invitee's temporary access rights. For example, if the invitee loses the right to temporarily access the area any time prior to the scheduled period, then server may rescind the invitee's temporary access. In one embodiment, the server may monitor the invitee's temporary access rights in real time. Alternatively, the server may determine the invitee's temporary access rights within a certain time period prior to the start of the access period.

In yet another embodiment, the server can monitor the access rights of all invitees having current authority to access the area. In one embodiment, monitoring the invitee's current authority includes determining whether the invitee has lost the right to access the area at all times or during the scheduled period. If an invitee loses its current authority, then the system may determine whether the invitee is authorized to temporarily access the restricted area 150.

In an embodiment, the server can determine whether an invitee is authorized to temporarily access a restricted area using a dynamic evaluation. In one embodiment, a dynamic evaluation determines the probability that an invitee is barred from temporarily accessing the restricted area during the scheduled period based on one or more data types. The probability may be calculated using any type of probability function. Data types may include, without limitation, various security risks associated with the restricted area, the initiator, the invitee, or the timing of the scheduled period. In yet another embodiment, a determined probability is compared to a preset default or administrator-defined threshold. If the threshold is exceeded, then the invitee is likely barred from accessing the area and may not be granted temporary access.

By way of example only, FIG. 19 illustrates a method to dynamically evaluate whether an invitee is authorized to temporarily access a restricted area 150. If the invitee is not currently authorized to access the restricted area, then the server collects one or more security data 165. Security data may include, without limitation, any data type that is relevant to and would facilitate determining the probability that an invitee is barred from receiving temporary access to a restricted area, such as but not limited to security restrictions associated with the initiator, invitee, or particular area. Furthermore, security data may be collected from memory stored on the server, an administrator, or any external device that stores such data.

In one embodiment, security data may include the restricted area's security level. Security levels may range from low to medium to high. Higher security levels may be associated with higher security risks. Therefore, at higher security levels it is more likely that an invitee is barred from temporary access. Alternatively, at lower security levels it is less likely that an invitee is barred from temporary access. In one embodiment, an administrator can pre-assign to the restricted area a high, medium, or low security level. In an alternative embodiment, the server may automatically assign to the restricted area a high, medium, or low security level based on the area's location or a security event (e.g., trespassing in the vicinity).

In yet another embodiment, security data may include a security event. A security event may include a trespassing, robbery, terrorist attack, fire, server hack, etc. Such events may elevate the security risk for a particular area. With a higher security risk it's more likely that an invitee is barred from temporary access. In one embodiment, an administrator may notify the server of a security event. In another embodiment, one or more external devices may notify the server of the security event. In still another embodiment, the server can automatically detect security events.

In another embodiment, security data may include restrictions associated with the initiator. Although the initiator may be currently authorized to access the restricted area, there may be other initiator restrictions. For example, the initiator may be restricted from inviting unauthorized invitees to a restricted area or the number of invitees may be limited. Alternatively, the initiator may be categorized as a high, medium, or low security risk, which may elevate the risk associated with access to certain restricted areas. In any case, the initiator's restrictions elevate the security risk for a particular area. With a higher security risk it's more likely that an invitee is barred from temporary access. In one embodiment, an administrator can assign to the initiator certain restrictions. In an alternative embodiment, the server may automatically assign restrictions to the initiator based on security events.

In another embodiment, security data may include restrictions associated with the invitee. For example, the invitee may be restricted from accessing certain security areas or security levels. Alternatively, the invitee may be categorized as a high, medium, or low security risk, which may elevate the risk associated with access to certain restricted areas. In any case, the invitee's restrictions elevate the security risk for a particular area. With a higher security risk it's more likely that the invitee is barred from temporary access. In one embodiment, an administrator can assign to the invitee certain restrictions. In an alternative embodiment, the server may automatically assign restrictions to the invitee based on security events.

After the system collects the security data 160, one or more values may be assigned. In one embodiment, a value represents the significance of a collected data type, including but not limited to the data types described above (e.g., security level, security events, initiator restrictions, invitee restrictions, etc.). In another embodiment, one or more values are assigned to each of the one or more invitees. These values may include preset default values and/or administrator defined values. Values may be numerical and scaled (e.g., from 1 to 10) and represent the weight the data type carries in a probability analysis. For example, the higher the value the higher the security risk. The higher the security risk the more probable the invitee is barred from receiving temporary access to the restricted area. Alternatively, the lower the value the lower the security risk. And the lower the security risk the less probable the invitee is barred from receiving temporary access to the restricted area. By way of example only, value may be represented as $V_n$, where n is a data type.

In one embodiment, a server may assign a value, $V_{level}$, to the invitee based on security level data, which is described above in detail. For an area with a higher security level there is a higher security risk, and the server may assign to the invitee a higher security level value. Alternatively, for an area with a lower security level there is a lower security risk, and the server may assign to the invitee a significantly lower security level value. By way of example only, for a high security area the server may assign to the invitee a substantially high security level value (e.g., 10). In another embodiment, for a medium security area the server may assign to the invitee a moderately high security level value (e.g., 7). Finally, for an unrestricted area the server may assign to the invitee a security level value=0. There are numerous possibilities or combinations in which values may be assigned based on security level.

In yet another embodiment, a server may assign a value, $V_{event}$, to the invitee based on security event data, which is described above in detail. Thus, if a high risk security vent occurs prior to the scheduled period the server may assign to the invitee a higher security event value. Alternatively, if a lower risk security event occurs prior to the scheduled period the server may assign to the invitee a substantially lower security value. By way of example only, a detected burglary in the vicinity of the area, associated building, or associated complex may present a significant security threat to the restricted area. In response, the server may assign to the invitee a substantially high security event value (e.g., 10). Alternatively, a more mild security event, such as a fire in an unrelated area, may present a much lower security threat to the area. In this case, the server may assign to the invitee a significantly lower security event value (e.g., 4). There are numerous possibilities or combinations in which values may be assigned based on security events.

In another embodiment, a server may assign a value, $V_{initiator}$, to the invitee based on initiator restriction data, which is described above in detail. Thus, if the initiator is associated with high risk access restrictions, the server may assign to the invitee a high initiator restriction value. Alternatively, if the initiator is associated with merely low risk restrictions, then the server may assign to the invitee a substantially lower initiator restriction value. By way of example only, the initiator may be restricted from inviting unauthorized invitees to the area. In response, the server may assign to the invitee a substantially high initiator restriction value (e.g., 10). Alternatively, the initiator may be considered a low security risk. In this case, the server may assign to the invitee a lower initiator restriction value (e.g., 2). There are numerous possibilities or combinations in which values may be assigned based on initiator restrictions.

In yet another embodiment, a server may assign a value, $V_{invitee}$, to the invitee based on invitee restriction data, which is described above in detail. Thus, if the invitee is associated with high risk access restrictions, the server may assign to the invitee a high invitee restriction value. Alternatively, if the invitee is associated with merely low risk restrictions, then the server may assign to the invitee a substantially lower invitee restriction value. By way of example only, the invitee may be restricted from accessing the particular area at all times. In response, the server may assign to the invitee a substantially high invitee restriction value (e.g., 10). Alternatively, the invitee may be considered a low security risk. In this case, the server may assign to the invitee a lower invitee restriction value (e.g., 3). There are numerous possibilities or combinations in which values may be assigned based on invitee restrictions.

After the server assigns values to the invitee 165 (e.g., $V_{level}$, $V_{event}$, $V_{initiator}$, $V_{invitee}$) those values may be weighted 170. In one embodiment, weighting the values includes adjusting (e.g., multiply) each value by a weight factor. The weight factor may be a preset default or administrator-defined multiplier that represents the importance of one data type over another. As with values, the weight factors may also be numerically scaled (e.g., 1 to 10). Thus, the higher the weight factor, the more important the security data type.

As an example, an administrator may consider security level data substantially more important than security event data. Thus, the administrator may configure the server to adjust the security level data value by a substantially higher weight factor a (e.g., $v_{level}$*10) and to adjust the security event data value by a substantially lower weight factor b (e.g., $V_{event}$*2). In yet another example, the administrator may consider initiator restriction data more important than security event data, but less important than security level data. Thus, the administrator may configure the server to adjust the initiator restriction data by a more moderate weight factor c (e.g., $V_{initiator}$*5).

Once the assigned values are weighted 170 the system can calculate a restriction probability 175. Any number of known probability functions can be used to calculate the restriction probability, such as but not limited to probability distribution functions, cumulative distribution functions, etc. In one embodiment, the restriction probability represents the probability that an invitee is barred from temporary access to the restricted area. In another embodiment, the restriction probability is based on one or more security data and preset default, administrator-defined, or dynamically determined weight factors. By way of example only, the above assigned weighted values may be combined (e.g., summed) to obtain a total restriction probability, RP. For example, the following equation represents one embodiment of determining a restriction probability:

$$V_{level}a+V_{event}b+V_{restriction}c=RP$$

The RP value represents the probability that an invitee is barred from receiving temporary access to the restricted area based on one or more security data ($V_n$) and preset default, administrator-defined, or dynamically determined weight factors (a, b, c). Furthermore, in addition to the security data, the server may also calculate the restriction probability based on any number of preset default parameters, preset administrator-defined parameters, dynamically determined parameters, or any combination of these factors.

The system next determines if the restriction probability exceeds a preset default or administrator-defined threshold 180. In one embodiment, the threshold represents the maximum probability at which an invitee is authorized to temporarily access a restricted area. In another embodiment, the system may compare the above calculated restriction probability RP to a security threshold.

If the restriction probability is greater than or equal to a threshold (e.g., RP≥security threshold), the server may consider the invitee unauthorized for temporary access 185. In one embodiment, the invitee may not be granted temporary access to the restricted area during the scheduled period. However, if the restriction probability is less than the security threshold (e.g., RP<security threshold), the server may consider the invitee authorized for temporary access 190. In another embodiment, the system may grant to the authorized invitee temporary access to the restricted area during the scheduled period.

Figure 1B:
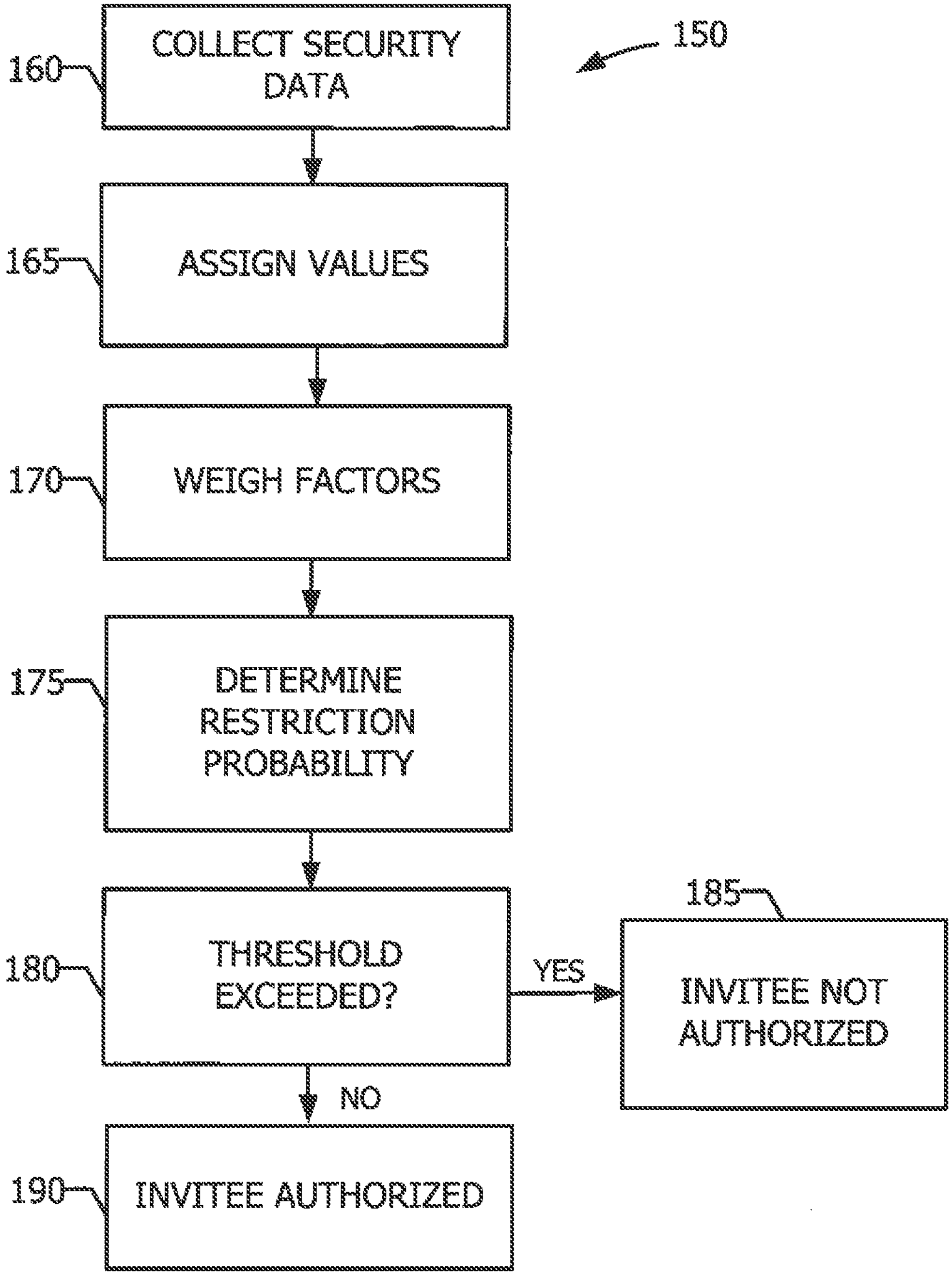
Figure 2:
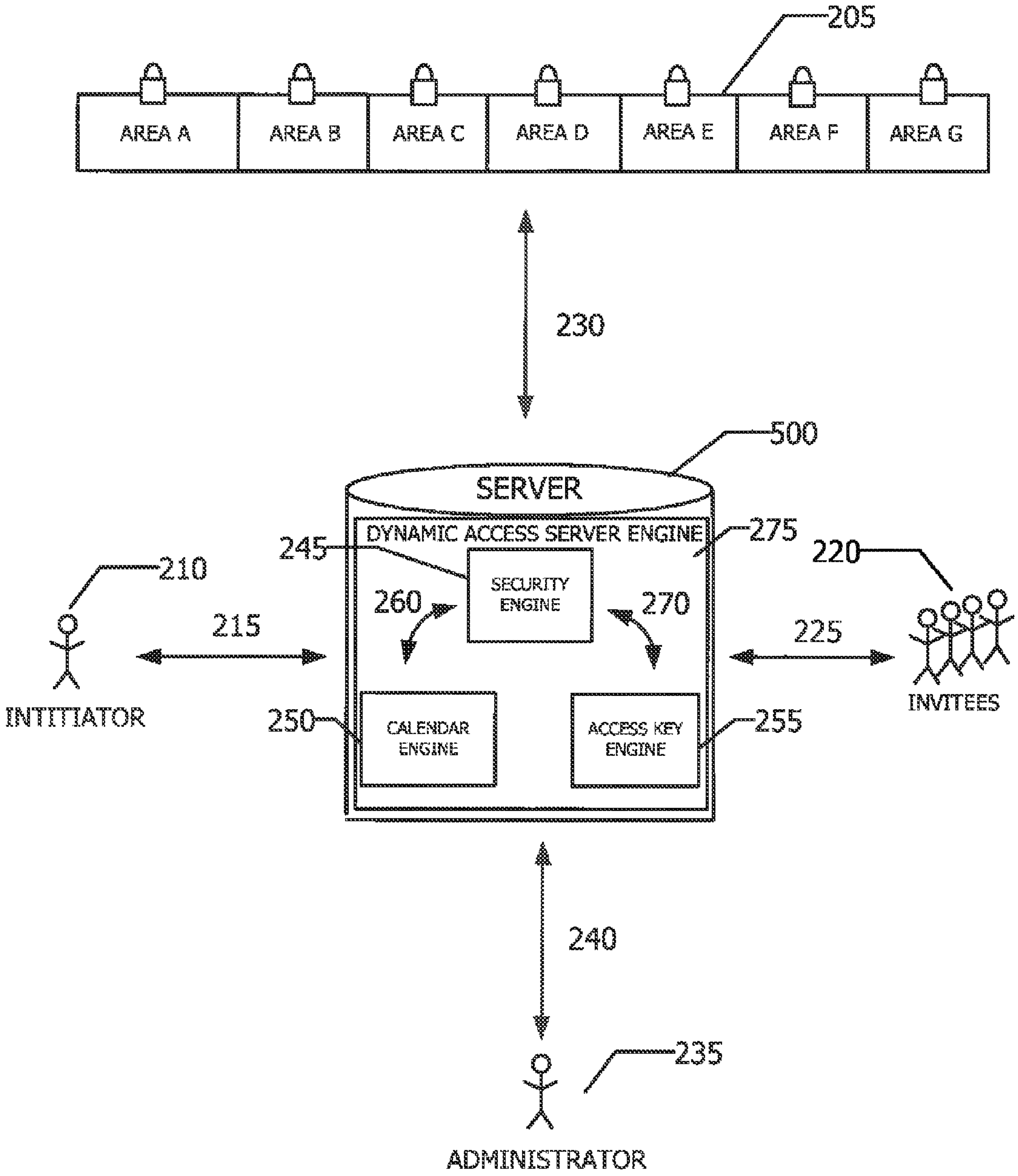
FIG. 2 is a diagram showing the interactions between an administrator, initiator, one or more invitees, one or more restricted rooms, and a server, in accordance with an embodiment.

FIG. 2 shows illustrative interactions between an administrator 235, initiator 210, one or more invitees 220, restricted areas 205, and a server 500. In one embodiment the server 500 includes the dynamic access server engine 275. The dynamic access server engine 275 may be designed to carry out the methods described in FIGS. 1A-1B, and any other methods derived therefrom or within the spirit and scope of this application.

Dynamic access server engine 275 may function as a stand-alone application or may integrate with the server's 500 operating system and hardware. The server 500 can be any type, including but not limited to two or more interconnected computer systems, workstation and desktop computer systems, mobile phones, music players, tablet computer systems, or other similar electronic devices.

The dynamic access server engine 275 can receive from the initiator 210 a request to access a restricted area 205 during a specific time period (215). The initiator's 210 request can be sent to the server 500 from any device type, including but not limited to workstation and desktop computer systems, mobile phones, tablet computer systems, or other similar electronic devices. The dynamic access server engine 275 may then transmit the request to a security engine 250 (260). In one embodiment, the security engine 250 can verify whether or not the initiator 210 has current authority to access the restricted area 205. If not authorized, then the dynamic access server engine 275 may deny the initiator's 210 access request. In one embodiment, the dynamic access server engine 275 notifies the initiator 210 (e.g., via email or text message) that the access request is denied (215).

If the initiator 210 does have current authority to access the area 205, then the security engine 250 can transmit the verification to a calendar engine 245 (260). The calendar engine 245 may then determine if the restricted area 205 is available to the initiator 210 during the requested time period. If unavailable, the calendar engine 245 may not schedule the access request, and the dynamic access engine 275 may notify the initiator 210 of the scheduling conflict. Otherwise, if the area 205 is available, the calendar engine 245 can schedule the access for the requested time period. In yet another embodiment, the dynamic access server engine 275 may notify the initiator 210 that the requested access has been scheduled (215).

In an embodiment, the initiator's 210 access request is associated with one or more invitees 220. The one or more invitees may include individuals both authorized and unauthorized generally to access the area 205. The dynamic access server engine 275 can send an access invitation to each of the one or more invitees 220 (225). If an invitee 205 declines the invitation, the server 500 may take no further action with respect to that invitee 220. However, if the invitee 220 accepts the invitation, then the calendar engine 245 transmits the identity of that invitee 220 to the security engine 250 (260).

Once the security engine 250 receives an invitee's 220 identity, it can determine whether the invitee 220 is currently authorized to access the area 205. If currently authorized, the server may take no further action with respect to that invitee 220 since the invitee 220 will be able to access the area 205 during the scheduled period. However, if the invitee 220 is not currently authorized to access the area 205, then the security engine 250 determines whether the invitee 220 is authorized to receive temporary access to the area 205. In one embodiment, the security engine 250 may collect one or more security data. As explained in detail above for FIGS. 1A-1B, security data may include, without limitation, any data type that is relevant to and would facilitate determining the probability that an invitee is barred from temporarily accessing the restricted area 205, such as but not limited to the area's 205 security level, any security events occurring prior to the scheduled access period, any restrictions associated with the initiator 210, and any restrictions associated with the invitee 220. Furthermore, security data may be collected from memory stored on the server 500, the administrator 235, or any external device that stores such data. In one embodiment, the administrator 235 manages security data parameters stored in the server 500 (240). In one embodiment, if an invitee 220 is authorized to access the area 205 at the time the initiator 210 schedules the meeting, but loses this access right before the meeting occurs, the same security check operation described here may be run either before, or at the time the invitee attempts to access the area 205.

After all security data is collected, as determined by preset defaults or administrator-configured settings, the security engine 250 may calculate the invitee's restriction probability, which is the probability that the invitee is barred from receiving temporary access to the restricted area 205. Any number of known probability functions can be used to calculate the restriction probability, such as but not limited to probability distribution functions, cumulative distribution functions, etc. Furthermore, in addition to the security data, the security engine 250 may also calculate the restriction probability based on preset default parameters, preset administrator-defined parameters, or both (e.g., weight factors).

In one embodiment, the security engine 250 may carry out the method illustrated in FIG. 1B and described in detail above. Thus, the security engine 250 may assign values $V_n$ to an invitee 220 for each collected security data type and adjust those values by preset default or administrator-defined weight factors. Furthermore, the security engine 250 may combine the weighted values to calculate a restriction probability RP. The security engine 250 can compare the restriction probability RP to a preset default or administrator-defined security threshold. In one embodiment, if RP≥security threshold (i.e. the invitee 220 is probably barred from temporary access) then no further action is required. In yet another embodiment, the dynamic access server engine 275 can alert the initiator 210 and/or invitee 220 that temporary access has been denied for that invitee 220 (215, 225). However, if RP<security threshold (i.e., the invitee 220 is probably authorized for temporary access), then the security engine 250 can transmit the verified authorization to an access key engine 255 (270). In another embodiment, the dynamic access server engine 275 can alert the initiator 210 and/or invitee 220 that temporary access has been verified (215, 225). The specified security threshold may be dynamic. That is, the threshold may be one value during one time period (e.g., 7:00 pm to 5:00 am) and another value during another time period (e.g., 5:00 am to 7:00 pm).

The access key engine 255 can grant temporary access to the restricted area 205 to any invitees 220 authorized for temporary access 220. As explained above in detail, in one embodiment, the access key engine 255 can generate an access key code that may be delivered by the dynamic access server engine 275 to the authorized invitees 220 (225) (e.g., via email or text message). The key code may be transmitted from the dynamic access server engine 275 to the restricted area's 205 door key code panel just prior to the scheduled period. An authorized invitee 220 can access the area 205 only during the scheduled period by entering the key code into the area 205 door's key code panel. In another embodiment, the access key engine 255 inactivates the key code either during or just after the scheduled access period.

Alternatively, in yet another embodiment, the access key engine 255 can add an authorized invitee's 220 badge ID to a list of personnel authorized to access the restricted area 205. In one embodiment, the dynamic access server engine 275 sends the authorized invitee's badge ID from the list to the restricted area's 205 door badge reader (230) just prior to the scheduled period. An authorized invitee 220 can access the area 205 only during the scheduled period by swiping their badge at the area 205 door's badge reader. In still another embodiment, when an invitee 220 presents their badge at the area 205 door's badge reader it may communicate with the dynamic access server engine 275 to verify the invitee's badge against the access control list (230). In yet another embodiment, the access key engine 255 can remove the invitee's 220 badge IDs from the access control list either during or just after the scheduled access period.

In one embodiment, the administrator 235 can configure the scope of temporary access. For example, the administrator 235 may limit an authorized invitee's 220 temporary access to a single entry (240). In addition, the administrator 235 may limit the invitee's 220 ability to access the area 205 to a certain time period prior to, during, or after the start of the scheduled period (240).

In another embodiment, the dynamic access server engine 275 monitors both the initiator's 210 and invitees' 220 security privileges starting from the time the access request is scheduled and the time the access period begins. For example, in one embodiment, the security engine 250 evaluates the initiator's 210 access rights and each invitee's 220 associated restriction probability RP in real time. By way of example, the initiator 210 may request access to a general area 205. If at least one of Area A through Area G is available, the calendar engine 250 may select one of them. In one embodiment, this selection may be random (e.g., if each of Area AG are the same size). In another embodiment, the calendar engine 250 may select an area based on size and the number of invitees. In a related embodiment, if the initiator 210 invites a large number of invitees 220, a large room may at first be allocated (e.g., Area A in 205). If only a few of the invitees accept, the calendar engine 250 may dynamically change the designated meeting place in area 205 to a smaller room (e.g., Area D in 205). This change may then be routed to the initiator 210 and invitees 220 via any desired means (e.g., email, text message, automated phone notification). Alternatively, the security engine 250 evaluates the initiator's 210 access rights and each invitee's 220 associated restriction probability RP just prior to the start of the scheduled period.

In one embodiment, if the initiator 210 loses access rights prior to the start of the scheduled period, the security engine 250 may notify the calendar engine 245 to de-schedule the meeting (260). Additionally, the security engine 250 may notify the access key engine 255 to remove temporary access rights for any authorized invitees 220 (270). In yet another embodiment, the dynamic access server engine 275 may notify the initiator 210 and any authorized invitee's 220 that the access request has been de-scheduled (215, 225).

In another embodiment, if an invitee's 220 restriction probability becomes greater than or equal to the security threshold before or during the scheduled period, then the security engine 250 may notify the access key engine 255 to remove the invitee's 220 temporary access (270). In still another embodiment, the dynamic access server engine 275 may notify the initiator 210 and/or invitee 220 that the invitee's 220 temporary access has been canceled (215, 225).

Figure 3:
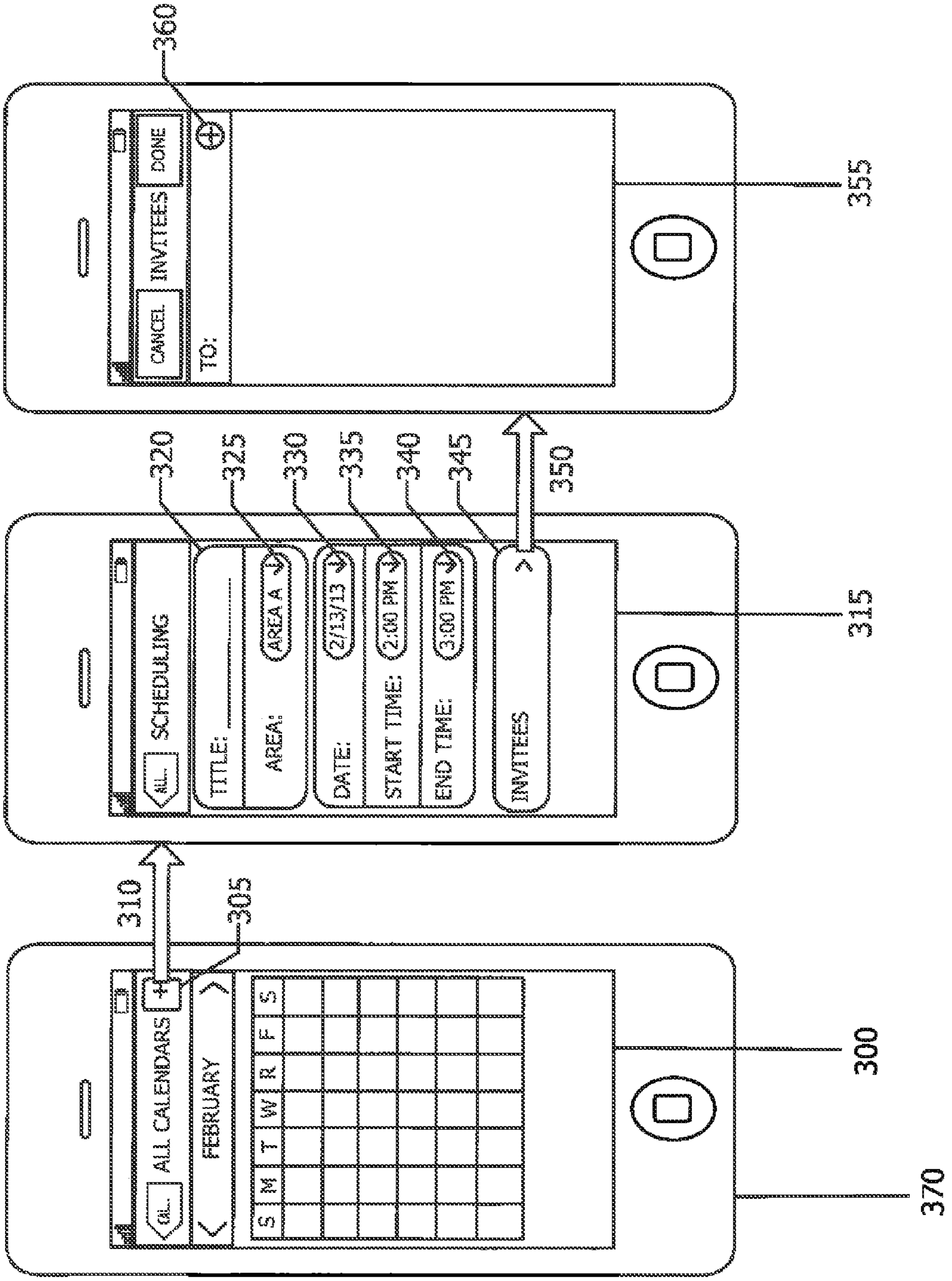
FIG. 3 shows a plurality of screens that may be displayed to schedule access to a restricted area, in accordance with an embodiment.

FIG. 3, by way of non-limiting example only, illustrates a plurality of screens that can be accessed by an initiator to schedule access to a restricted area. The screen features can be activated via buttons, which may include touch buttons, sliders, switches, control pads, keys, knobs, scroll wheels, keyboards, mice, touchpads, etc., or some combination thereof. In one embodiment, the buttons may allow a user to navigate a graphical user interface (GUI) display. Further, in certain embodiments, the buttons may include a touch screen mechanism. In such embodiments, a user may select or interact with displayed interface elements by simply touching those elements as they are displayed.

In one embodiment, an initiator can schedule access to a restricted area through a calendar interface 300 on a device 370. The calendar interface 300 may be a stand-alone application or integrated with the device's 370 operating system. Furthermore, the device 370 can be any type, including but not limited to workstation and desktop computer systems, mobile phones, personal music players, tablet computer systems, or other similar electronic devices.

To schedule access to a restricted area the initiator may select an access request button 305 in the calendar interface 300. Selecting (310) this button 305 opens a scheduling interface 315. In one embodiment, the initiator can name the request in a title field 320. The initiator can also set the date, start time, and end time via various drop down menus 330, 335, 340. Furthermore, the initiator can also select the access area via a drop down menu 325. In another embodiment, the initiator can associate one or more invitees to the request by selecting an invitees button 345. Selecting this button may open an invitees interface 355 (350). In one embodiment, scheduling interface 315 may be coupled to a company-wide address list. In another embodiment, scheduling interface 315 may be coupled to the initiator's 210 personal address list as stored in the device 370. In still another embodiment, scheduling interface 315 may be coupled to multiple address list sources (e.g., personal and company-wide).

The initiator can add one or more invitees to the request by selecting an add invitees button 360. In yet another embodiment, selecting add invitees button 360 opens the invitee's contacts list on the device. After the request is created, the initiator can select a button 375 to transmit the request to a server system, such as the one described above for FIG. 2.

Figure 4:
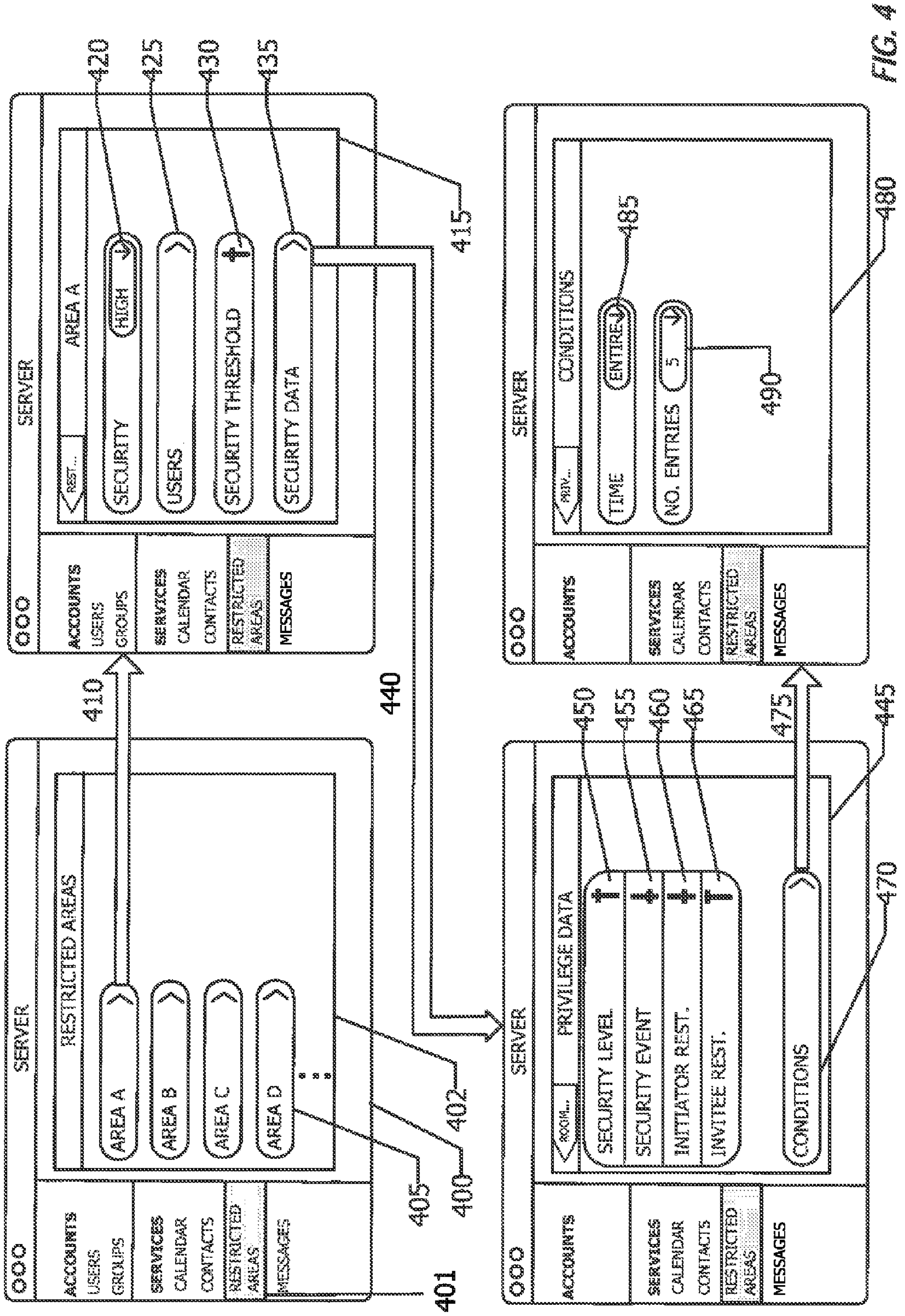
FIG. 4 shows a plurality of screens that may be displayed to configure area security restrictions, in accordance with an embodiment.

FIG. 4, by way of example only, illustrates a plurality of screens that can be accessed by an administrator to configure security settings for restricted areas. The screen features can be activated via buttons, which may include touch buttons, sliders, switches, control pads, keys, knobs, scroll wheels, keyboards, mice, touchpads, etc., or some combination thereof. In one embodiment, the buttons may allow a user to navigate a graphical user interface (GUI) display. Further, in certain embodiments, the buttons may include a touch screen mechanism. In such embodiments, a user may select or interact with displayed interface elements by simply touching those elements.

In one embodiment, the administrator may access a server management interface 400 on a device. The server management interface 400 may be a stand-alone application or integrated with the device's operating system. Furthermore, the device can be any type, including but not limited to workstation and desktop computer systems, mobile phones, personal music players, tablet computer systems, or other similar electronic devices.

In an embodiment, the administrator can select (410) a restricted area tab 401 to view a restricted area interface 402. The restricted area interface 402 includes restricted area buttons 405. Each button 405 is associated with a restricted area. For example, the administrator can select the button for Area A to access the Area A interface 415. In one embodiment, the administrator can modify the security level assigned to Area A via a drop down menu 420. In another embodiment, the interface 415 includes a users button 425. Selecting this button opens an interface in which the administrator can either add to or delete users from a list of users currently authorized to access Area A. In yet another embodiment, the interface 415 includes a security threshold slider 430 to manually adjust the security threshold. In one embodiment, the security threshold may be the security threshold described above for FIG. 1B. In this example, the security threshold represents the maximum probability at which an invitee is considered authorized to temporarily access Area A.

In another embodiment, the interface 415 also includes a security data button 435. The administrator can select this button to configure the importance assigned to one or more security data. As explained in detail above for FIGS. 1A-1B, security data may include, without any data type that is relevant to and would facilitate determining the probability that an invitee is barred from temporarily accessing the Area A, such as but not limited to Area A's security level, any security events occurring prior to the scheduled access period, any restrictions associated with the initiator, and any restrictions associated with the invitee. In one embodiment, selecting (440) the security data button 435 may open a security data interface 445. The administrator can assign weight factors to one or more security data, each weight factor representing the importance of one security data type over another in the probability analysis described above in FIG. 1B. For example, the administrator can adjust various sliders 450, 455, 460, and 465 to assign weight factors to security level data, security event data, initiator restriction data, and invitee restriction data, respectively.

In yet another embodiment, the administrator can select a scope button 470 to configure the scope of temporary access. For example, selecting this button 470 may open a scope interface 480 (475). The administrator can set the time period within which an invitee may access Area A via a drop down menu 485. For example, the administrator can set the time period to "entire" so that the invitee has access to Area A during the entire scheduled period. Alternatively, the administrator can set the time to 10 minutes so that the invitee can only access Area A in the first 10 minutes following the start of the scheduled period. In still another embodiment, the administrator can set the maximum number of times that the invitee can access Area A during the scheduled period via a drop down menu 490.

Figure 5:
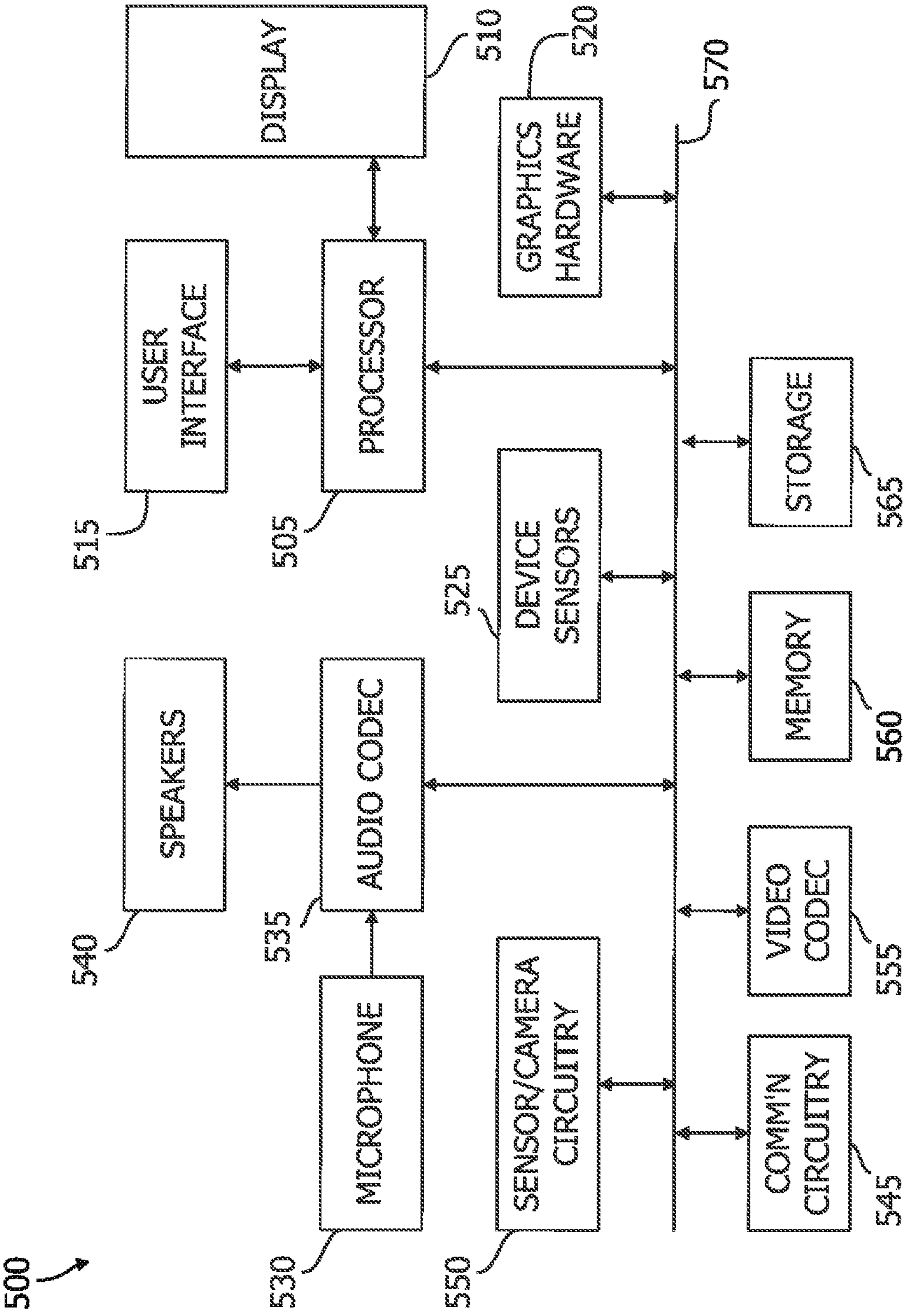
FIG. 5 shows a model server, in accordance with an embodiment.

FIG. 5, by way of non-limiting example, illustrates one embodiment of the server 500. The server 500 may include a processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. The electronic device 500 may be, for example, a personal digital assistant (PDA), personal music player, mobile telephone, notebook, laptop, tablet computer, or any other similar device. Furthermore, the above described dynamic access server engine 275 may be executed on a server that takes the form of server 500.

The processor 505 may execute instructions necessary to carry out or control the operation of many functions performed by server 500. The processor 505 may, for instance, drive display 510 and receive user input from user interface 515. User interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction set computer (RISC) or complex instruction-set computer (CISC) architectures or any other suitable architecture, and may include one or more processing cores. Graphics hardware 520 may be special purpose computational hardware for processing graphics and/or assisting processor 505 to process graphics information. In one embodiment, graphics hardware 620 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by processor 505 the computer program code may implement one or more of the methods described herein.

It's understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory computer storage medium encoded with a computer program, the computer program comprising instructions that when executed by a data processing apparatus cause the data processing apparatus to:

receive a request from an initiator to schedule a meeting in a restricted area during a time period for one or more invitees;

schedule the meeting for the requested time period;

send an invitation associated with the meeting to the one or more invitees, wherein the invitation can be accepted or declined;

receive an indication that one or more of the invitees has accepted the invitation;

determine whether the one or more invitees that accepted the invitation are authorized to temporarily access the restricted area during the time period by:

identifying an invitee from the one or more invitees that accepted the invitation, determining a value indicative of a probability that the identified invitee is not authorized to temporarily access the restricted area based at least in part on a security level of the restricted area, a security event occurring prior to the scheduled period, and a security restriction associated with the invitee, and determining the value is less than a specified threshold; and grant temporary access to the restricted area for the duration of the time period to one or more invitees determined to be authorized.

2. The non-transitory program storage device of claim 1, wherein the instructions to cause the data processing apparatus to receive a request from an initiator comprise instructions to cause the data processing apparatus to receive a request from a scheduling application that automatically generates the request.

3. The non-transitory program storage device of claim 2, wherein the instructions to cause the data processing apparatus to receive a request from an initiator further comprise instructions to cause the data processing apparatus to verify the initiator is authorized to access the restricted area.

4. The non-transitory program storage device of claim 1, wherein the instructions to cause the data processing apparatus to schedule the access comprise instructions to cause the data processing apparatus to schedule the access using a server-based calendar application.

5. The non-transitory program storage device of claim 1, wherein the instructions to cause the data processing apparatus to determine a value indicative of a probability that the identified invitee is not authorized to temporarily access the restricted area comprise instructions to cause the data processing apparatus to determine a value based, at least in part, on a security restriction associated with the initiator.

6. The non-transitory program storage device of claim 1, wherein the instructions to cause the data processing apparatus to determine the value comprise instructions to cause the data processing apparatus to determine the value indicative of a probability based, at least in part, on a weighted sum of the security level of the restricted area, the security event occurring prior to the scheduled period, and the security restriction associated with the invitee.

7. The non-transitory program storage device of claim 6, wherein weights for at least one of the security level of the restricted area, the security event occurring prior to the scheduled period, and the security restriction associated with the invitee are set in accordance with an administrator-defined preference.

8. The non-transitory program storage device of claim 1, further comprising instructions to cause the data processing apparatus to deny temporary access to the restricted area during the time period to one or more invitees not determined to be authorized.

9. A method, comprising:

receiving a request from an initiator to schedule a meeting in a restricted area during a specified time period for one or more invitees;

sending an invitation associated with the meeting to the one or more invitees, wherein the invitation can be accepted or declined;

receiving an indication that one or more of the invitees has accepted the invitation;

determining a first value indicative of a probability that a first invitee of the one or more invitees that accepted the invitation is not authorized to temporarily access the restricted area during the time period by:

identifying an invitee from the one or more invitees that accepted the invitation, determining a value indicative of a probability that the identified invitee is not authorized to temporarily access the restricted area based at least in part on a security level of the restricted area, a security event occurring prior to the scheduled period, and a security restriction associated with the invitee, and determining the value is less than a specified threshold; and granting, to the first invitee, temporary access to the restricted area during the specified time period based, at least in part, on having determined the first value is less than the threshold.

10. The method of claim 9, wherein the threshold comprises a value that changes based, at least in part, on a time of day.

11. The method of claim 9, further comprising:

determining a second value indicative of a probability that a second invitee of the one or more invitees that accepted the invitation is not authorized to temporarily access the restricted area;

determining the second value is greater than or equal to the threshold; and denying the second invitee temporary access to the restricted area during the specified time period based, at least in part, on having determined the second value is greater than or equal to the threshold.

12. The method of claim 11, further comprising notifying the initiator that the second invitee has been denied temporary access to the restricted area.

13. The method of claim 9, wherein the act of determining the first value comprises determining the first value indicative of a probability based, at least in part, on a weighted sum of the security level of the restricted area, the security event occurring prior to the scheduled period, and the security restriction associated with the invitee.

14. The method of claim 13, wherein the wherein the act of determining the first value comprises determining the first value indicative of a probability based, at least in part, on a security restriction associated with the initiator.

15. The method of claim 9, further comprising:

making a first determination that the first invitee loses access to the restricted area between a time the first invitee was granted temporary access and the specified time period; and denying the first invitee temporary access to the restricted area during the specified time period based, at least in part, on the first determination.

16. A system, comprising:

a display; and one or more processors configured to perform operations comprising:

determining an invitee of a meeting scheduled in a restricted area for a specified time period has accepted an invitation to join the meeting;

determining a first value indicative of a probability that the invitee is not authorized to temporarily access the restricted area during the specified time period by:

identifying an invitee from the one or more invitees that accepted the invitation, determining a value indicative of a probability that the identified invitee is not authorized to temporarily access the restricted area based at least in part on a security level of the restricted area, a security event occurring prior to the scheduled period, and a security restriction associated with the invitee, and determining the value is less than a specified threshold; and automatically granting to the invitee temporary access to the restricted area during the specified time period based, at least in part, on having determined the first value is less than a threshold.

17. The system of claim 16, wherein the act of determining a first value comprises determining a first value based, at least in part, on a security restriction associated with the initiator.

18. The system of claim 16, wherein the one or more processors are further configured to grant to the invitee a temporary access key to the restricted area, wherein the access key is only operable during the time period.

* * * * *